US006336535B1

(12) United States Patent
Lisenker

(10) Patent No.: US 6,336,535 B1
(45) Date of Patent: Jan. 8, 2002

(54) MAGNETO-RHEOLOGICAL DAMPER WITH DUAL FLUX RING SPACER

(75) Inventor: Ilya Lisenker, Miamisburg, OH (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/808,247

(22) Filed: Mar. 14, 2001

(51) Int. Cl.⁷ .................................................. F16F 15/03
(52) U.S. Cl. ..................... 188/267.2; 188/267
(58) Field of Search .......................... 188/267, 267.1, 188/267.2, 269, 322.22; 267/140.14, 140.15

(56) References Cited

U.S. PATENT DOCUMENTS

| | | | | |
|---|---|---|---|---|
| 5,018,606 A | * | 5/1991 | Carlson | 188/267.1 |
| 5,277,281 A | | 1/1994 | Carlson et al. | |
| 5,573,088 A | * | 11/1996 | Daniels | 188/267 |
| 5,678,808 A | | 10/1997 | Claude et al. | |
| 5,878,851 A | * | 3/1999 | Carlson et al. | 188/267 |
| 5,984,060 A | | 11/1999 | Clark et al. | |
| 6,158,470 A | * | 12/2000 | Ivers et al. | 251/129.01 |
| 6,202,806 B1 | * | 3/2001 | Sandrin et al. | 188/267.2 |
| 6,260,675 B1 | * | 7/2001 | Muhlenkamp | 188/267 |

FOREIGN PATENT DOCUMENTS

WO    WO 98/00653    1/1998

* cited by examiner

Primary Examiner—Christopher P. Schwartz
(74) Attorney, Agent, or Firm—Scott A. McBain

(57) ABSTRACT

An MR fluid damper having an annular flux ring assembly surrounding a piston core piston assembly which is disposed for reciprocal movement in a cylinder. The flux ring assembly has first and second ferromagnetic flux rings forming opposite ends of the flux ring assembly, and a nonmagnetic annular spacer interposed between the ferromagnetic flux rings. The annular spacer has a plurality of first projecting members extending between the piston core and the flux ring assembly. The plurality of projecting members align the piston core concentrically with respect to the flux ring assembly to form an annular, first flow path between the piston core and the annular flux ring. In an alternative embodiment, the annular spacer has a plurality of second projecting members extending between the flux ring assembly and the cylinder. The second projecting members align the flux ring assembly concentrically with respect to the cylinder, thereby forming an annular, second flow path between the flux ring and the cylinder.

18 Claims, 2 Drawing Sheets

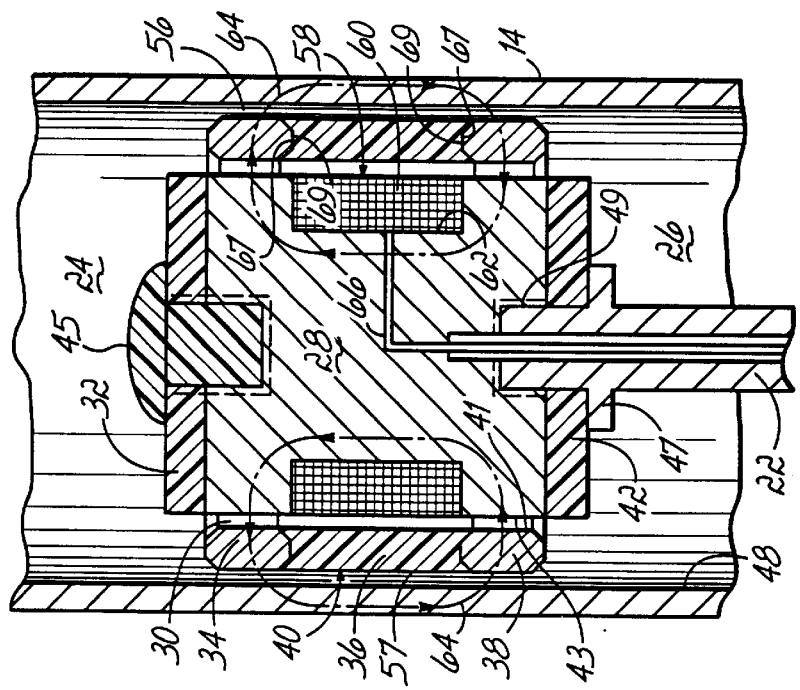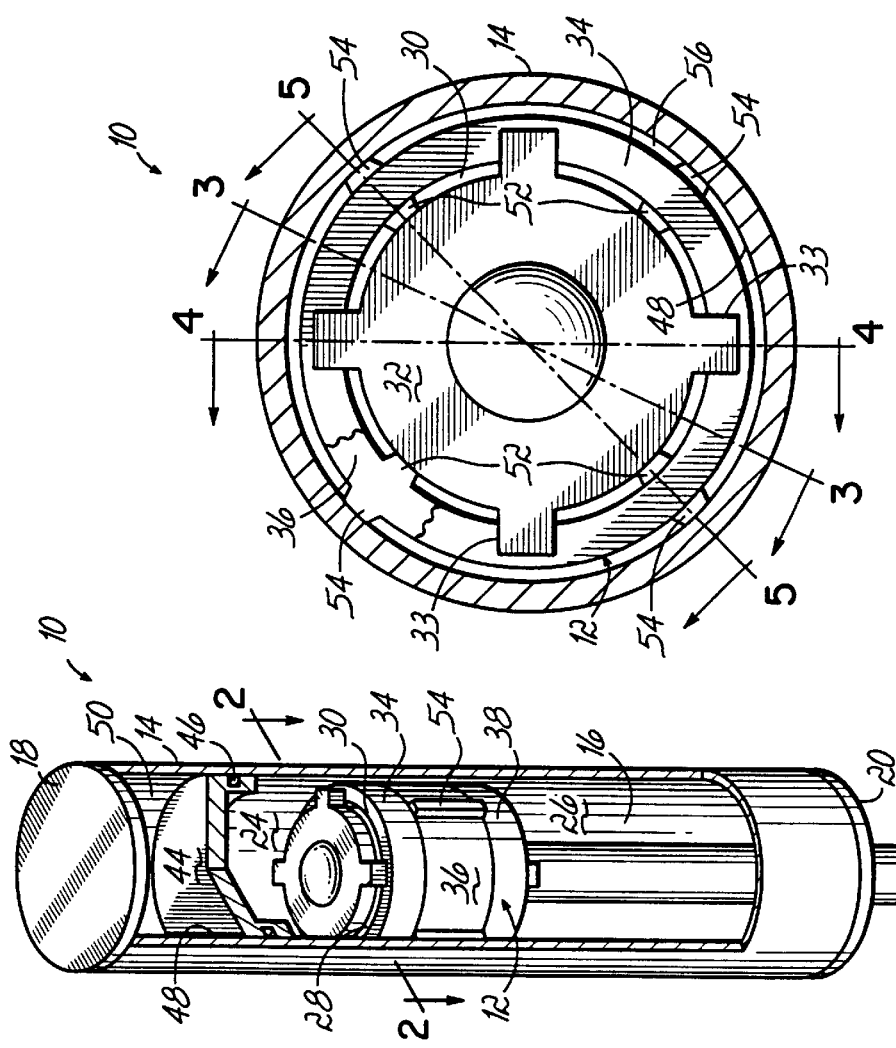

MAGNETO-RHEOLOGICAL DAMPER WITH DUAL FLUX RING SPACER

CROSS REFERENCE TO PENDING APPLICATIONS

This application is also related to the following co-pending and commonly owned application which was filed on even date herewith by Ilya Lisenker: U.S. Ser. No. 09/808,247 entitled "MAGNETORHEOLOGICAL DAMPER WITH DUAL FLUX RING SPACER" and which is hereby incorporated by reference herein in its entirety.

FIELD OF THE INVENTION

The present invention relates to a magneto-rheological (MR) fluid damper, and more particularly, to a linearly-acting MR fluid damper suitable for vibration damping in a vehicle suspension system.

BACKGROUND OF THE INVENTION

MR fluids are materials that respond to an applied magnetic field with a change in rheological behavior (i.e., change in formation and material flow characteristics). The flow characteristics of these non-Newtonian MR fluids change several orders of magnitude within milliseconds when subjected to a suitable magnetic field. In particular, magnetic particles noncolloidally suspended in fluid align in chain-like structures parallel to the applied magnetic field, changing the shear stress exerted on adjacent shear surfaces.

Devices such as controllable dampers benefit from the controllable shear stress of MR fluid. For example, linearly-acting MR fluid dampers are used in vehicle suspension systems as vibration dampers. At low levels of vehicle vibration, the MR fluid damper lightly damps the vibration, providing a more comfortable ride, by applying a low magnetic field or no magnetic field at all to the MR fluid. At high levels of vehicle vibration, the amount of damping can be selectively increased by increasing the applied magnetic field. The controllable damper lends itself to integration in vehicle suspension systems that respond to vehicle load, road surface condition, and driver preference for a stiffer suspension performance.

In some applications, linearly-acting MR fluid dampers use a piston assembly that moves within a cylinder providing a reservoir of MR fluid. A piston assembly disposed within the cylinder separates the reservoir into a compression chamber and an extension chamber. The piston assembly has a piston core positioned within a flux ring to form an annular flow gap therebetween. Relative motion between the damper body tube and the piston assembly is dampened by a flow of the MR fluid through the flow gap from one chamber to another caused by the relative motion.

Alignment of the flux ring is critical for optimum performance. Ideally, the piston assembly should move freely within the reservoir in the damper body tube without friction or binding. In addition, the radial width and concentricity of the annular flow passage must be precisely set and maintained along the axial length of the passage throughout the operation to ensure optimum, predictable control of the damping. Consequently, the flux ring must be correctly aligned with the piston core.

Attachment elements have been suggested to provide flux ring alignment with nonmagnetic bridge elements. In particular, perforated end plates are aligned above and below the flux ring and piston core. These attachment elements have several potential problems. First, the attachment elements increase the length of the piston assembly. Consequently, less travel distance is available for the piston to move within the cylindrical reservoir of the damper body tube. Second, the attachment elements require tight manufacturing tolerances in order to correctly align the flux ring to the piston core. Third, such attachment elements often include tabs or other projections that increase the drag as the piston moves, which may undesirable. Fourth, the attachments elements have numerous components and require manufacturing operations such as spot welding. Therefore, such attachment elements are costly to manufacture and time consuming to assemble.

Consequently, there is a need for an improved piston assembly suitable for use in a magneto-rheological (MR) fluid damper.

SUMMARY OF THE INVENTION

The present invention provides an improved piston assembly for use in an MR fluid damper that provides increased performance. Further, the piston assembly of the present invention provides greater damping capability for a given length of piston. In addition, with the piston assembly of the present invention, the part count of the piston assembly is reduced; and the piston assembly is easier to assemble in a desired alignment. Thus, the piston assembly of the present invention is of a simpler construction than known damper pistons, can be manufactured for less cost and provides an MR fluid damper having better performance without a substantial increase in cost or weight.

According to the principles of the present invention and in accordance with the described embodiment, the present invention provides an MR fluid damper having an annular flux ring assembly surrounding a piston core piston assembly and disposed for reciprocal movement in a cylinder. The flux ring assembly has first and second ferromagnetic flux rings forming opposite ends of the flux ring assembly. A nonmagnetic annular spacer is interposed between the first and second ferromagnetic flux rings. The annular spacer has a plurality of first projecting members extending between the piston core and the flux ring assembly which align the piston core concentrically with respect to the flux ring assembly, thereby forming an annular, first flow path between the piston core and the annular flux ring.

In another aspect, the present invention provides a plurality of second projecting members extending between the flux ring assembly and the cylinder to align the flux ring assembly concentrically with respect to the cylinder, thereby forming an annular, second flow path between the flux ring and the cylinder.

The second projecting members are also relatively inexpensive and simple structures that not only provide the desired concentric alignment but also function as interrupted bearings between the cylinder and the flux ring assembly. In addition, the second flow path provides additional shear area and hence, damping effect, for a given length of the piston assembly.

These and other objects and advantages of the present invention will become more readily apparent during the following detailed description taken in conjunction with the drawings herein.

BRIEF DESCRIPTION OF THE DRAWINGS

The accompanying drawings, which are incorporated in and constitute a part of this specification, illustrate embodiments of the invention and, together with the general description of the invention given above and the detailed description of the embodiments given below, serve to explain the principles of the present invention.

FIG. 1 is partially cut-away perspective view of a MR fluid damper in accordance with the principles of the present invention.

FIG. 2 is a top cross section view of a piston assembly and cylinder reservoir of the MR fluid damper of FIG. 1 along lines 2—2.

FIG. 3 is a side cross section view of the piston assembly and cylinder reservoir of the MR fluid damper of FIG. 2 along lines 3—3.

DETAILED DESCRIPTION OF THE INVENTION

Figure 4:
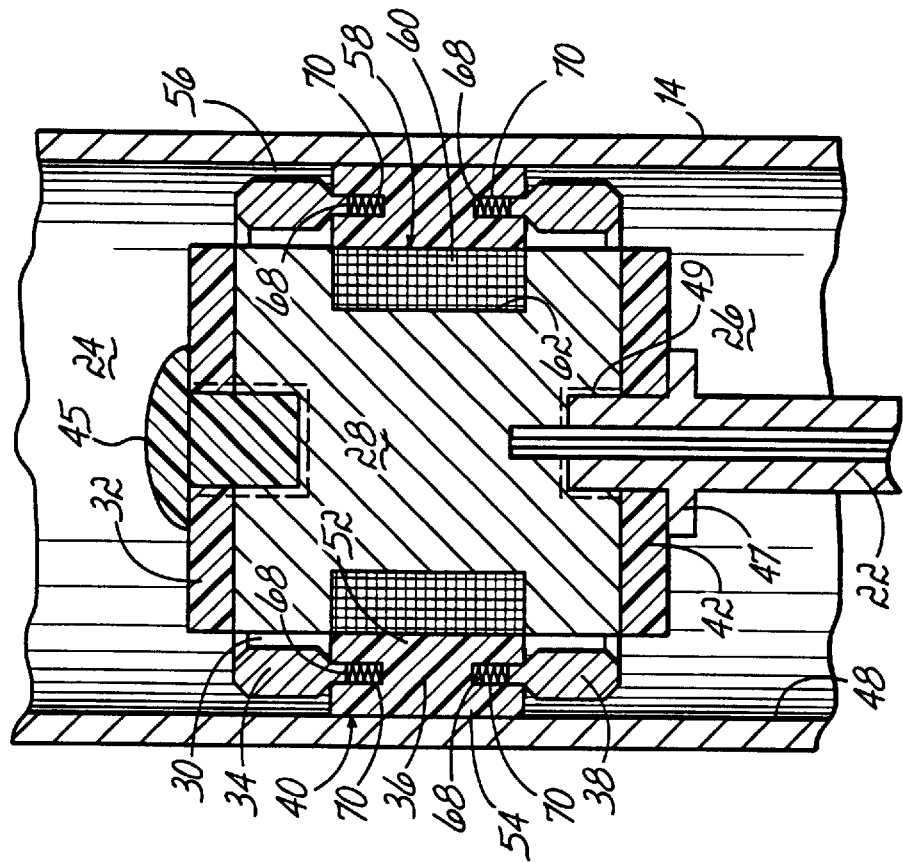
FIG. 4 is a side cross section view of the piston assembly and cylinder reservoir of the MR fluid damper of FIG. 2 along lines 4—4.

For purposes of this description, words such as "upper", "lower", "right", "left" and the like are applied in conjunction with the drawings for purposes of clarity. As is well known, dampers may be oriented in substantially any orientation, so these directional words should not be used to imply any particular absolute directions for a damper consistent with the invention.

Referring to the drawings, illustrated in FIG. 1 is a linearly-acting magneto-rheological (MR) fluid damper, in particular a strut 10. In general, the strut 10 is designed for operation as a load-bearing and shock-absorbing device within a vehicle suspension system, and is connected between the sprung (body) and unsprung (wheel assembly) masses (not shown).

Strut 10 includes a piston assembly 12 mounted for movement inside a cylinder 14 providing a reservoir for a volume of MR fluid 16. The cylinder 14 has a closed end 18 and an open end 20. The piston assembly 12 is connected to and driven by a piston rod 22 that passes through and seals with the open end 20 of the cylinder 14.

The piston assembly 12 divides the volume of MR fluid 16 within the cylinder 14 into a compression chamber 24 and an extension chamber 26. Fundamentally, during damping, the MR fluid present in one of the chambers 24, 26 of cylinder 14 flows through and/or around the piston assembly 12, for example, extension chamber 26 to compression chamber 24, as the cylinder 14 moves upward relative to the piston assembly 12.

The MR fluid 16 within cylinder 14 may be any conventional fluid including magnetic particles such as iron or iron alloys which can be controllably suspended within the fluid by controlling a magnetic field thereby varying the flow characteristics of the MR fluid 16.

A gas cup 44 is also carried in the cylinder 14 between the piston assembly 12 and the closed end 18. The gas cup 44 carries a dynamic seal 46 and slides along an inner surface 48 of cylinder 14, separating a compensation chamber 50 from the compression chamber 24. While the extension chamber 26 and compression chamber 24 carry a supply of MR fluid 16, the compensation chamber 50 carries a compressible nitrogen gas supply. During extension and compression directed travel of the cylinder 14 relative to the piston assembly 12, a decreasing or an increasing volume of the piston rod 22 is contained within the cylinder 14 depending on the stroke position of the strut 10. In order to compensate for this varying volumetric amount of the piston rod 22 within the fluid-filled chambers 24 and 26, the gas cup 44 slides, compressing or expanding the compensation chamber 50.

As shown in FIG. 3, the piston assembly 12 includes a piston core 28 containing ferromagnetic material. A magnet assembly 58 is part of the piston assembly 12. More particularly, a magnetic coil 60 is wound around an annular recess 62 in the outer surface 43 of the piston core 28. If the cylinder 14 is made from a soft magnetic material, for example, low carbon steel, the magnetic coil 60 generates a magnetic field as depicted by arrows 64. Electrical wiring 66 is routed through piston rod 22 to provide electrical current to the coil 60.

An annular flux ring assembly 40 is axially positioned adjacent the piston core 28 to form an inner annular flow gap or path 30 therebetween. The inner flow path 30 has a thickness determined by the radial distance between a cylindrical inner surface 41 of the flux ring assembly 40 and an outer surface 43 of the piston core 28. The flux ring assembly 40 is comprised of an upper and lower, annular, ferromagnetic flux rings 34, 38, respectively and an intermediate, nonmagnetic annular spacer 36. The annular spacer 36 axially, that is, longitudinally, positions and separates the ferromagnetic rings 34, 38.

Referring to FIG. 2, the annular spacer 36 includes nonmagnetic inwardly projecting members 52 that form an interrupted bearing on the outer surface 43 of the piston core 28. The projecting members 52 function to concentrically align the flux ring assembly 40 with the piston core 28 and to provide a concentric inner flow path 30. The concentric alignment is achieved independent of end members 32, 42.

In addition, the annular spacer 36 includes nonmagnetic outwardly projecting members 54 that form an interrupted bearing on the inner surface 48 of the cylinder 14. The piston assembly 12 is disposed in the cylinder 14 to form an outer flow gap or path 56 between the substantially cylindrical inner surface 48 of the cylinder 14 and the substantially cylindrical outer surface 57 of the flux ring assembly 40. Thus, the projecting members 52 function to concentrically align the piston assembly 12 with the cylinder 14, and such concentric alignment provides a concentric outer flow path 56 that has a constant and uniform width. The concentric, outer flow path 56 provides additional shear surface to increase damping performance and/or to allow shortening the piston assembly 12.

The ferromagnetic ring assembly 40 has aligning elements 67, 69 to hold the ferromagnetic rings 34, 38 in a concentric alignment with the spacer 36. Each of the opposite ends of the annular spacer 36 has an annular groove 67 disposed therein. One end of each ferromagnetic member 34, 38 has a lip 69 with a cross-sectional shape mating or interlocking with a cross-sectional shape of the groove 67. Thus, when the lips 69 are placed in the grooves 67, respective inner and outer surfaces of the ferromagnetic rings 34, 38 and spacer 36 are aligned to form substantially uninterrupted and contiguous inner and outer surfaces 41, 57 of the flux ring assembly 40. Such contiguous surfaces 41, 57 maintain a substantially laminar flow of the MR fluid through the inner and outer flow paths 30, 56, thereby providing a predictable and consistently repeatable shearing action. The aligning elements 67, 69 also maintain the whole of the flux ring assembly 40 concentrically aligned with the piston assembly 12. As will be appreciated, the aligning elements may take many different forms and shapes as well as be located continuously or intermittently around the ends of the annular spacer 36 and ferromagnetic elements 34, 38.

Referring to FIGS. 2 and 4, upper and lower end members 32, 42, respectively, are made from a nonmagnetic material, for example, stainless steel, aluminum, copper and brass alloys, and have respective upper and lower radially extending protrusions or fingers 33, 35. The end members 32, 42 axially constrain the flux ring assembly 40 without any rigid connection therebetween such as spot welding. The upper end member 32 is connected to the piston core 28 by a fastener 45, for example, a threaded screw. The lower end member 42 is secured to the piston core 28 by the attachment, for example, a flange 47 and threaded connection 49, of the piston rod 22 to the piston core 28. As another example, the attachment may comprise a retaining ring made from wound wire. As will be appreciated, the end members 32, 42 can be joined with the piston core 28 to form a unitary structure by a variety of fastening elements, adhesives, etc.

Figure 5:
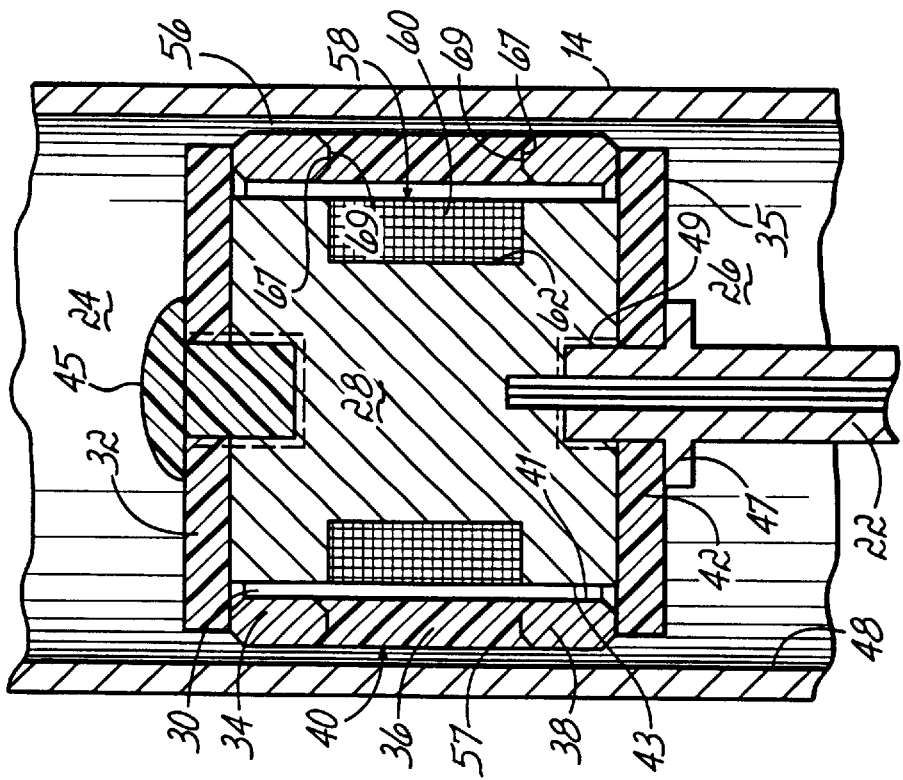
FIG. 5 is a side cross section view of the piston assembly and cylinder reservoir of the MR fluid damper of FIG. 2 along lines 5—5.

Referring to FIG. 5, a plurality of biasing elements, for example, wavy wire rings acting as compression springs, 68 are disposed in recesses 70 in the annular spacer 36. The compression springs 68 axially preload the ferromagnetic rings 34, 38 against respective upper and lower fingers 33, 35 of the respective end members 32, 42. Consequently, a more secure assembly of the flux ring assembly 40 to the piston core 28 is achieved, even if looser tolerances are allowed in component dimensions.

As will be appreciated, other devices and/or configurations may be used to achieve the desired biasing or preloading, such as a plurality of small compression springs disposed within individual holes within the annular spacer 36, each spring acting against a respective one of the ferromagnetic rings 34, 38.

Although compression springs 68 are shown between the annular spacer 36 and ferromagnetic rings 34, 38, as will be appreciated, the springs 68 may be disposed in various places in the flux ring assembly 40. In some applications, springs 68 may be used only between one selected ferromagnetic ring 34, 38 and the annular spacer 36. In other applications, the springs 68 may act between a selected ferromagnetic ring 34, 38 and the corresponding end member 34, 42. And in other applications, the springs 68 may comprise a resilient material rather than a coiled metal wire. The resilient material may be affixed to, or comprise, one or more of the annular spacer 36, ferromagnetic rings 34, 38 and end members 34, 42.

The above-described embodiment utilizes dual flow paths 30, 56. In an alternative embodiment, the outwardly projecting members 54 on the annular spacer 36 can be deleted to eliminate the outer flow path 56. In this embodiment, the outer surface 57 of the flux ring assembly 40 functions as a plain bearing against the inner surface 48 of the cylinder 14 and provides a fluid seal with the inner surface 48. Thus, the cylinder 14 slides relative to the flux ring assembly 40 without significant leakage of the MR fluid therebetween.

As will be appreciated, with the above alternative embodiment, the annular spacer 36 may contain a ferromagnetic material. Then the flux ring assembly 40 and piston core 28 comprise the magnetic circuit with little or no magnetic field 64 passing through the cylinder 14; and the cylinder 14 may be made of a thinner material, if desired.

In use, a linearly-acting MR fluid damper, such as a strut 10, of FIG. 1 can be applied to a vehicle suspension system. The damping action of the strut 10 is changed by applying an electric current to the coil 60 that is representative of the desired damping effect between the sprung and unsprung masses of the vehicle. The electric current creates a magnetic field that sets the flow characteristics of the MR fluid in the flow paths 30, 56, thereby providing the desired damping effect between the sprung and unsprung masses of the vehicle.

The MR fluid damper 10 has a piston assembly with a flux ring assembly 40 made of magnetic and nonmagnetic annular rings 34, 38, 36 that can be easily aligned, assembled and axially or longitudinally fixed with respect to the piston core. In one embodiment, an outer surface 57 of the flux ring assembly 40 functions as a liquid tight bearing against the inner surface 48 of the cylinder 14. The nonmagnetic annular ring facilitates the use of first projecting members 52 that concentrically align the flux ring assembly 40 with the piston core 28 to form the inner flow path 30. The flux ring assembly 40 with the first projecting members 52 is a relatively inexpensive and simple structure that provides a desired concentric alignment.

In another embodiment, the nonmagnetic annular member 36 has second projecting members 54 that concentrically align the flux ring assembly 40 with the cylinder 14 to form the outer flow path 56. The second projecting members 54 also function as interrupted bearings between the flux ring assembly 40 and the cylinder 14. The flux ring assembly 40 with the second projecting members 54 is also relatively inexpensive and simple structure that provides a desired concentric alignment. Further, the outer flow path 56 provides additional shear area and hence, damping effect, for a given length of the piston assembly 12.

Thus, the MR fluid damper 10 is relatively simple and inexpensive to manufacture and assemble. Further, the MR fluid damper 10 provides greater damping capability for a given length of piston. In an alternative embodiment, the use of the intermittent bearings permits a larger diameter piston core to be used which also provides more shear area and more damping capability. Thus, the MR fluid damper 10 of the present invention has increased performance and without a substantial increase in cost or weight.

While the present invention has been illustrated by the description of embodiments thereof, and while the embodiments have been described in considerable detail, it is not intended to restrict or in any way limit the scope of the appended claims to such detail. Additional advantages and modifications will readily appear to those skilled in the art. For example, the piston assembly described herein has application to other linearly-acting MR fluid dampers, for example twin-tube struts and shock absorbers.

The invention in its broader aspects is, therefore, not limited to the specific details, representative apparatus and method, and illustrative examples shown and described. Accordingly, departures may be made from such details without departing from the spirit or scope of the general inventive concept.

Having described the invention, what is claimed is:

1. A magneto-rheological ("MR") fluid damper comprising:
   a cylinder containing an MR fluid; and
   a piston assembly disposed for reciprocal movement in the cylinder comprising
      a piston core,
      an annular flux ring assembly surrounding the piston core, the flux ring assembly comprising
         a first ferromagnetic flux ring forming one end of the flux ring assembly;
         a second ferromagnetic flux ring forming an opposite end of the flux ring assembly; and
         an nonmagnetic annular spacer interposed between the first and second ferromagnetic flux rings, the annular spacer having a plurality of first projecting members extending between the piston core and the flux ring assembly, the plurality of projecting members aligning the piston core concentrically with respect to the flux ring assembly to form an annular, first flow path between the piston core and the annular flux ring.

2. The MR damper of claim 1 wherein the annular spacer further comprises a plurality of second projecting members extending between the flux ring assembly and the cylinder, the plurality of second projecting members aligning the flux ring assembly concentrically with respect to the cylinder to form an annular, second flow path between the flux ring assembly and the cylinder.

3. The MR damper of claim 1 wherein the cylinder comprises ferrous material for longitudinally conducting the magnetic field.

4. The MR damper of claim 1 wherein the first ferromagnetic ring comprises a first alignment element on one end thereof and the annular spacer has a second alignment element on one end thereof, the first and second alignment elements having mating cross-sectional profiles and the first and second alignment elements being engaged to concentrically align the first ferromagnetic element with the annular spacer.

5. The MR damper of claim 4 wherein the second ferromagnetic ring comprises a third alignment element on one end thereof and the annular spacer has a fourth alignment element on an opposite end thereof, the third and fourth alignment elements having mating cross-sectional profiles and the third and fourth alignment elements being engaged to concentrically align the second ferromagnetic element with the annular spacer.

6. The MR damper of claim 5 wherein the first and third alignment elements comprise substantially identical annular lips projecting from the respective ends of the first and second ferromagnetic rings and the second and fourth alignment elements comprise substantially identical annular grooves sized to receive the annular lips.

7. The MR damper of claim 5 wherein the flux ring assembly further comprises a biasing element disposed between the first ferromagnetic ring and the annular spacer to apply a preload force on the first ferromagnetic ring.

8. The MR damper of claim 7 wherein the annular spacer further comprises a recess disposed in the one end thereof and a compression spring disposed in the recess for applying the preload force against the one end of the first ferromagnetic ring.

9. The MR damper of claim 7 wherein the flux ring assembly further comprises a biasing element disposed between the second ferromagnetic ring and the annular spacer to apply a preload force on the second ferromagnetic ring.

10. The MR damper of claim 9 wherein the annular spacer further comprises a recess disposed in the opposite end thereof and a compression spring disposed the recess in the opposite end for applying the preload force against the one end of the second ferromagnetic ring.

11. The MR damper of claim 1 further comprising upper and lower end members mounted to respective upper and lower ends of the piston core, each of the upper and lower end members having projections extending over respective upper and lower ends of the flux ring assembly to axially fix the flux ring assembly with respect to the piston core.

12. The damper of claim 11 wherein the projections on each of the end members comprise substantially radially extending fingers.

13. A piston assembly for use within a cylinder of a magneto-rheological ("MR") fluid damper comprising:
a piston core adapted to be disposed in the cylinder;
an annular flux ring assembly surrounding the piston core, the flux ring assembly comprising
a first ferromagnetic flux ring forming one end of the flux ring assembly,
a second ferromagnetic flux ring forming an opposite end of the flux ring assembly, and
an nonmagnetic annular spacer interposed between the first and second ferromagnetic flux rings, the annular spacer having a plurality of first projecting members extending between the piston core and the flux ring assembly, the plurality of projecting members aligning the piston core concentrically with respect to the flux ring assembly to form an annular, first flow path between the piston core and the annular flux ring.

14. A flux ring assembly surrounding a piston core within a cylinder of a magneto-rheological ("MR") fluid damper comprising:
a first ferromagnetic flux ring forming one end of the flux ring assembly,
a second ferromagnetic flux ring forming an opposite end of the flux ring assembly, and
an nonmagnetic annular spacer interposed between the first and second ferromagnetic flux rings, the annular spacer having a plurality of first projecting members extending between the piston core and the flux ring assembly, the plurality of projecting members aligning the piston core concentrically with respect to the flux ring assembly to form an annular, first flow path between the piston core and the annular flux ring.

15. A magneto-rheological ("MR") fluid damper comprising:
a cylinder containing an MR fluid; and
a piston assembly disposed for reciprocal movement in the cylinder comprising
a piston core,
an annular flux ring assembly surrounding the piston core,
a plurality of first projecting members extending between the piston core and the flux ring assembly, the plurality of projecting members aligning the piston core concentrically with respect to the flux ring assembly to form an annular, first flow path between the piston core and the annular flux ring, and
a plurality of second projecting members extending between the flux ring assembly and the cylinder, the plurality of second projecting members aligning the flux ring assembly concentrically with respect to the cylinder to form an annular, second flow path between the flux ring and the cylinder.

16. The MR damper of claim 15 wherein the flux ring assembly comprises:
a first ferromagnetic flux ring forming one end of the flux ring assembly;
a second ferromagnetic flux ring forming an opposite end of the flux ring assembly; and
an nonmagnetic annular spacer interposed between the first and second ferromagnetic flux rings.

17. The MR damper of claim 16 wherein the annular spacer has inner and outer surfaces and the first projecting members and the second projecting members are fixed to the respective inner and outer surfaces of the annular spacer.

18. The MR damper of claim 17 wherein the first and the second projecting members extend substantially radially with respect to the annular spacer.

* * * * *